(12) United States Patent
Nagayama et al.

(10) Patent No.: US 7,513,574 B2
(45) Date of Patent: Apr. 7, 2009

(54) LIGHT ALLOY SEAT BACK FRAME FOR VEHICLE SEAT, AND RECLINING VEHICLE-SEAT WITH THE SEAT BACK FRAME

(75) Inventors: Masaki Nagayama, Tochigi (JP); Nobuhiro Inomata, Tochigi (JP); Isao Awano, Saitama (JP)

(73) Assignees: TS TECH Co., Ltd., Saitama (JP); HONDA MOTOR Co., Ltd., Tokyo (JP)

( * ) Notice: Subject to any disclaimer, the term of this patent is extended or adjusted under 35 U.S.C. 154(b) by 591 days.

(21) Appl. No.: 11/185,354

(22) Filed: Jul. 20, 2005

(65) Prior Publication Data

US 2006/0103223 A1    May 18, 2006

(30) Foreign Application Priority Data

Jul. 21, 2004   (JP) .............................. 2004-212551
Jul. 21, 2004   (JP) .............................. 2004-212553

(51) Int. Cl.
    *A47C 7/02*    (2006.01)
(52) U.S. Cl. ............................. 297/452.18; 297/216.13; 297/367; 297/354.1
(58) Field of Classification Search ............ 297/216.13, 297/367, 354.1, 452.18, 463.1, 463.2
    See application file for complete search history.

(56) References Cited

U.S. PATENT DOCUMENTS

| 5,509,716 | A | * | 4/1996 | Kolena et al. ........... 297/216.13 |
| 5,584,525 | A | * | 12/1996 | Nakano et al. ............. 296/68.1 |
| 5,749,624 | A | * | 5/1998 | Yoshida ...................... 297/367 |
| 5,918,943 | A | * | 7/1999 | Mitschelen et al. ..... 297/452.18 |
| 5,938,265 | A | * | 8/1999 | Oyabu et al. ............... 296/68.1 |
| 6,065,803 | A | * | 5/2000 | Li et al. .................... 297/301.3 |
| 6,132,003 | A | * | 10/2000 | Sakurai et al. ......... 297/452.18 |
| 6,378,946 | B1 | * | 4/2002 | Cope et al. ................ 297/452.2 |
| 6,779,841 | B2 | * | 8/2004 | Eckendorff ............. 297/216.13 |
| 6,860,561 | B2 | * | 3/2005 | Takata ...................... 297/378.1 |
| 7,066,552 | B2 | * | 6/2006 | Yoshida .................. 297/452.18 |
| 7,090,293 | B2 | * | 8/2006 | Saberan et al. ......... 297/216.13 |
| 7,222,915 | B2 | * | 5/2007 | Philippot et al. ....... 297/216.13 |

FOREIGN PATENT DOCUMENTS

JP          06255409 A   *   9/1994

* cited by examiner

*Primary Examiner*—Laurie K Cranmer
(74) *Attorney, Agent, or Firm*—Dann, Dorfman, Herrell and Skillman, P.C.

(57) ABSTRACT

A light alloy seat back frame for a vehicle seat, including a pair of spaced apart side sections, an upper section interconnecting the side sections, a lower section formed into a substantially plate-shape having a width, the lower section extending between lower regions of rear sides of the side sections and interconnecting the side sections, the upper, side and lower sections being integrally made of light alloy, and a belt-shaped metal plate fixed onto a surface of the lower section. The seat back frame further includes a recliner mechanism for allowing a seat back of the vehicle seat to be pivoted with respect to a seat cushion of the vehicle seat. The recliner mechanism comprises cam devices mounted onto lower regions of outer surfaces of the side sections, and an actuating shaft extending along the lower section and interconnecting the cam devices. A metal pipe member for reinforcing a lower part of the seat back frame is mounted around an axial portion of the actuating shaft. There is also disclosed a vehicle seat provided with the seat back frame.

38 Claims, 6 Drawing Sheets

LIGHT ALLOY SEAT BACK FRAME FOR VEHICLE SEAT, AND RECLINING VEHICLE-SEAT WITH THE SEAT BACK FRAME

FIELD OF THE INVENTION

This invention relates to a seat back frame for a vehicle seat, in which the entire seat back frame is made of light alloy, and a reclining vehicle-seat that is provided with such a seat back frame.

BACKGROUND OF THE INVENTION

Hitherto, there has been known a seat back for a vehicle seat, in which a seat back frame made of recyclable light alloy such as magnesium alloy, aluminum alloy or the like is employed (Japanese Patent Application Laid-Open No. 2001-114004).

The conventional seat back frame that is made of light alloy includes a frame body that is formed into a substantially inverted U-shape in outline. Recliner means for allowing the seat back to be pivoted with respect to a seat cushion of the vehicle seat is attached to a lower part of the seat back frame. The frame body includes left and right side sections that are spaced apart from each other, and an upper section interconnecting the left and right sections. The frame body further has a lower section that is formed into a flat plate-shape having a width, extending between lower regions of the left and right side sections and interconnecting the lower regions of the left and right side sections.

However, the lower section of the seat back frame that is merely formed into a flat plate-shape having a width is undesirable since when the lower section is subjected to any external force that may be applied to the seat back frame by, for example, crashing, and should the lower section be broken, a broken portion of the lower section may be excessively projected.

Similarly, the lower section of the seat back frame is undesirable in terms of stiffness or resistance to the external force that may be applied to the seat back frame by, for example, the crashing. In order to provide sufficient stiffness for the lower section, the lower section may be heavy-sectioned. However, this is contrary to a demand for weight-lightening of the seat back frame.

SUMMARY OF THE INVENTION

The present invention has been made with a view to overcoming the forgoing problems of the prior art seat back frame for the vehicle seat.

It is therefore an object of the present invention to provide a light alloy seat back frame for a vehicle seat, wherein when a flat plate-shaped lower section of the seat back frame is subjected to any external force, even if the lower section is broken, a broken portion of the lower section can be prevented from being excessively projected, with a simple construction.

It is another object of the present invention to provide a light alloy seat back frame for a vehicle seat, wherein with a simple construction that does not impede mounting of recliner means for allowing a seat back of the vehicle seat to be pivoted with respect to a seat cushion of the vehicle seat, a flat plate-shaped lower section of the seat back frame can provide stiffness or resistance to any external force that may be applied to the seat back frame.

It is still another object of the present invention to provide a reclining vehicle-seat that is provided with such a seat back frame as set forth.

In accordance with one aspect of the present invention, there is provided a light alloy seat back frame for a vehicle seat. The seat back frame comprises a pair of spaced apart side sections, an upper section interconnecting the spaced apart side sections, a lower section formed into a substantially plate-shape having a width, the lower section extending between lower regions of rear sides of the spaced apart side sections and interconnecting the spaced apart side sections, the upper, side and lower sections being integrally made of light alloy, and a belt-shaped metal plate applied along a longitudinal direction of the lower section and fixed onto a surface of the lower section. The belt-shaped metal plate may be formed with at least two horizontally extending holes. The belt-shaped plate is fixed onto the surface of the lower section by fastening the belt-shaped metal onto the surface of the lower section by means of bolts that are penetrated through the lower section from substantially central portions of the at least two horizontally extending holes, and nuts.

The seat back frame may include a recliner means for allowing a seat back of a vehicle seat to be pivoted with respect to a seat cushion of the vehicle seat, and a metal pipe for reinforcing a lower part of the seat back frame. The recliner means comprises cam devices mounted onto lower regions of outer surfaces of the spaced apart side sections, and an actuating shaft extending along the lower section and interconnecting the cam devices. The pipe member is mounted around an axial portion of the actuating shaft. The metal pipe member may have a length relatively shorter than that of the actuating shaft. The metal pipe member may be provided with collars that are attached to both end portions of the pipe member. The collars are made of resinous material. The pipe member may be idlingly mounted around the axial portion of the actuating shaft.

In accordance with a further aspect of the present invention, there is provided a vehicle seat that is provided with a light alloy seat back frame. The seat back frame comprises a pair of spaced apart side sections, an upper section interconnecting the spaced apart side sections, a lower section formed into a substantially plate-shape having a width, the lower section extending between lower regions of rear sides of the spaced apart side sections and interconnecting the spaced apart side sections, the upper, side and lower sections being integrally made of light alloy, and a belt-shaped metal plate applied along a longitudinal direction of the lower section and fixed onto a surface of the lower section. The belt-shaped metal plate may be formed with at least two horizontally extending holes. The belt-shaped plate is fixed onto the surface of the lower section by fastening the belt-shaped metal onto the surface of the lower section by means of bolts that are penetrated through the lower section from substantially central portions of the at least two horizontally extending holes, and nuts.

In the vehicle seat, the seat back frame may include a recliner means for allowing a seat back of the vehicle seat to be pivoted with respect to a seat cushion of the vehicle seat, and a metal pipe for reinforcing a lower part of the seat back frame. The recliner means comprises cam devices mounted onto lower regions of outer surfaces of the spaced apart side sections, and an actuating shaft extending along the lower section and interconnecting the cam devices. The pipe member is mounted around an axial portion of the actuating shaft. The metal pipe member may have a length relatively shorter than that of the actuating shaft. The metal pipe member may be provided with collars that are attached to both end portions of the pipe member. The collars are made of resinous material. The pipe member may be idlingly mounted around the axial portion of the actuating shaft.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote like or corresponding parts throughout, wherein.

DETAILED DESCRIPTION OF A PREFERRED EMBODIMENT

Referring now to FIGS. 1 to 4, there is illustrated a seat back frame 1 that is one of elements making up a seat back for a vehicle seat according to an embodiment of the present invention. The seat back frame 1 comprises an upper section 10, left and right side sections 11, 12 that are spaced apart from each other, and a lower section 13. They are integrally formed. The upper section 10 interconnects upper regions of the left and right side sections 11, 12. The lower section 13 interconnects lower regions of the left and right side sections 11, 12. The entire seat back frame 1 is made of light alloy such as magnesium alloy, aluminum alloy or the like. Preferably, the entire seat back frame is made from magnesium alloy that is light weight and recyclable, by die casting or injection molding.

A part of the seat back frame 1 that includes the upper section 10 and the left and right side sections 11, 12 is formed into a substantially inverted U-shape in outline. The upper section 10 comprises a forward projecting top plate 10a including both circular-arced shoulder portions, a back plate 10b vertically extending from a rear edge of the top plate 10a to an inside of the seat back frame 1 and a first hem portion 10c that extends along a lower edge of the back plate 10b and projects forward from the lower edge of the back plate 10b. Stiffness of the upper section 10 is provided by the top plate 10a, the back plate 10b and the first hem portion 10c. The left side section 11 comprises a first side plate 11a continuously extending downward from one of the shoulder portions of the upper section 10 and projecting forward, a first plate-shaped portion 11b disposed perpendicular to the first side plate 11a, continuously extending downward from the back plate 10b of the upper section 10 along a rear side of the first side plate 11a, and a second hem portion 11c that continuously extends downward from the first hem portion 10c along an inner edge of the first plate-shaped portion 11b and projects forward. Similarly, the right side section 12 comprises a second side plate 12a continuously extending downward from the other of the shoulder portions of the upper section 10 and projecting forward, a second plate-shaped portion 12b disposed perpendicular to the second side plate 12a, continuously extending downward from the back plate 10b of the upper section 10 along a rear side of the second side plate 12a, and a third hem portion 12c that continuously extends downward from the first hem portion 10c along an inner edge of the second plate-shaped portion 11b and projects forward. Stiffness of the left and right side sections 11, 12 is provided by the first and second side plates 11a, 12a, the first and second plate-shaped portions 11b, 12b and the second and third hem portions 11c, 12c.

The lower section 13 interconnects lower regions of the first and second plate-shaped portions 11b, 12b. Thus, the entire seat back frame is formed into a substantially quadrilateral shape by the upper section 10, the side sections 11, 12 and the lower section 13. In order that a space for installation of recliner means with respect to the seat back frame can be obtained, the lower section 13 is formed into a substantially plate-shape having a width and is flush with the first and second plate-shaped portions 11b, 12b. The lower section 13 has a fourth hem portion 13a that continuously extends from the second and third hem portions 11c, 12c along an inner edge of the lower section 13 and projects forward.

Figure 1:
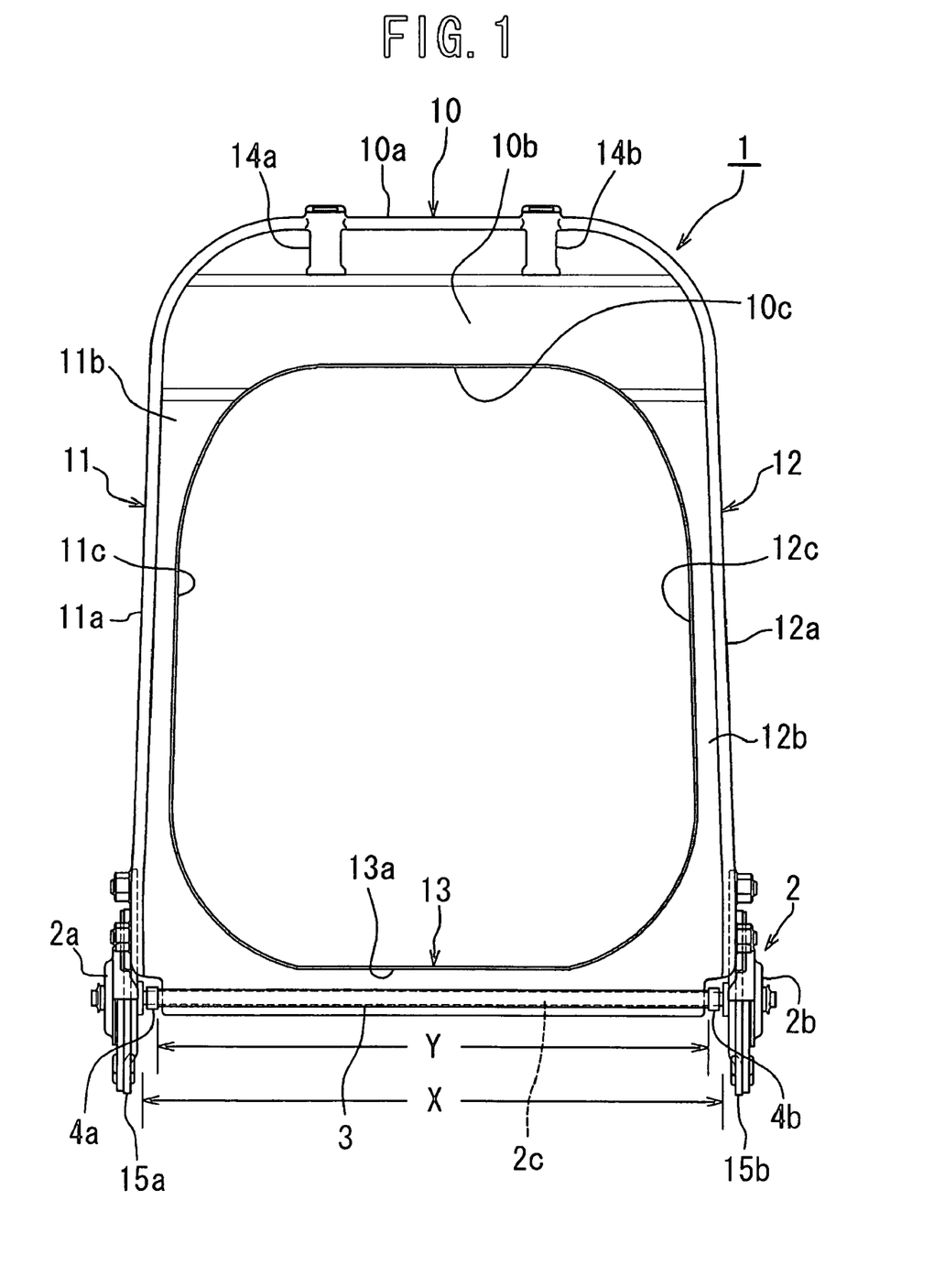
FIG. 1 is a schematic front view of a light alloy seat back frame for a vehicle seat according to the present invention.
Figure 2:
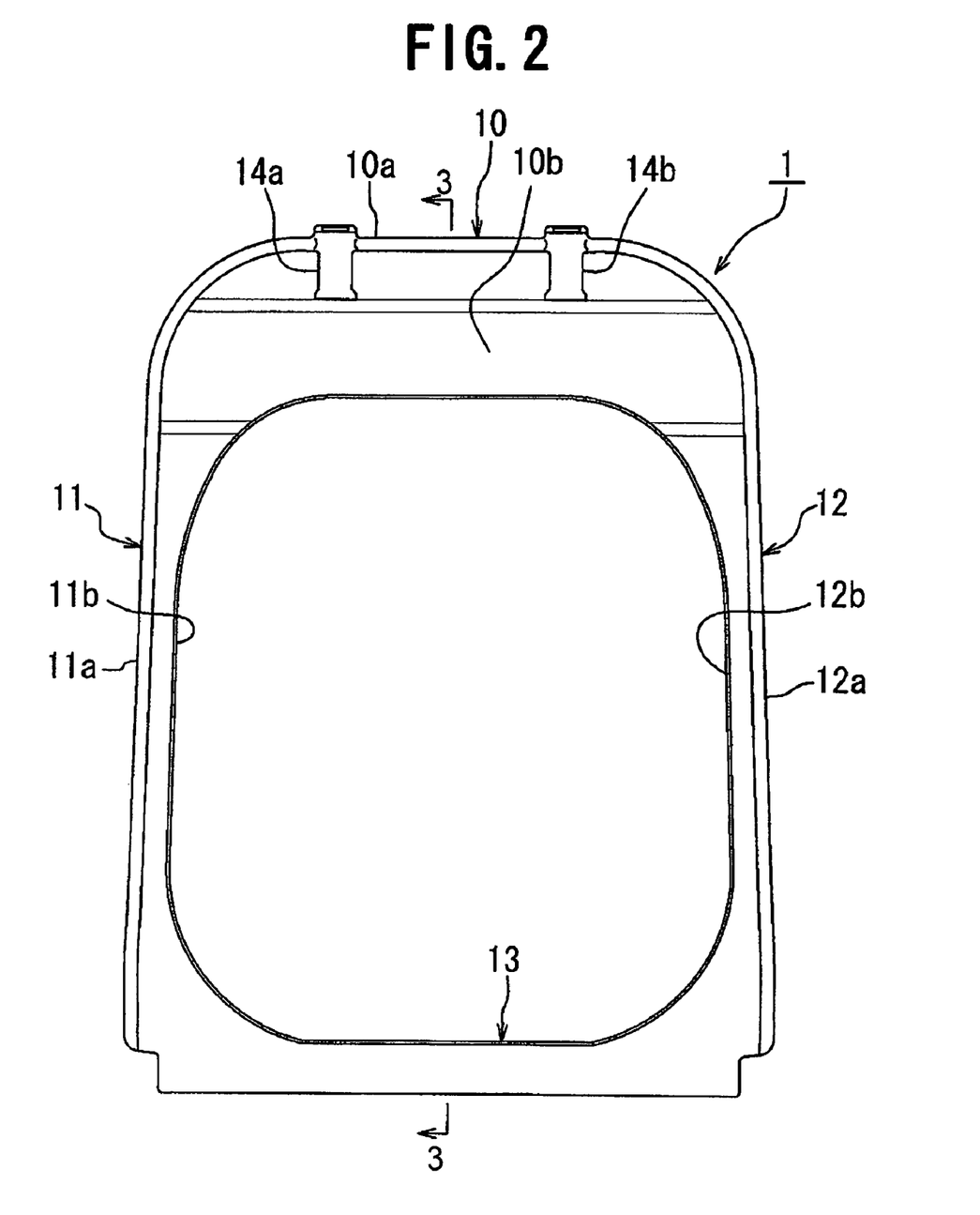
FIG. 2 is a schematic front view of the light alloy seat back frame of FIG. 1, in which associated parts of the seat back frame are removed.
Figure 3:
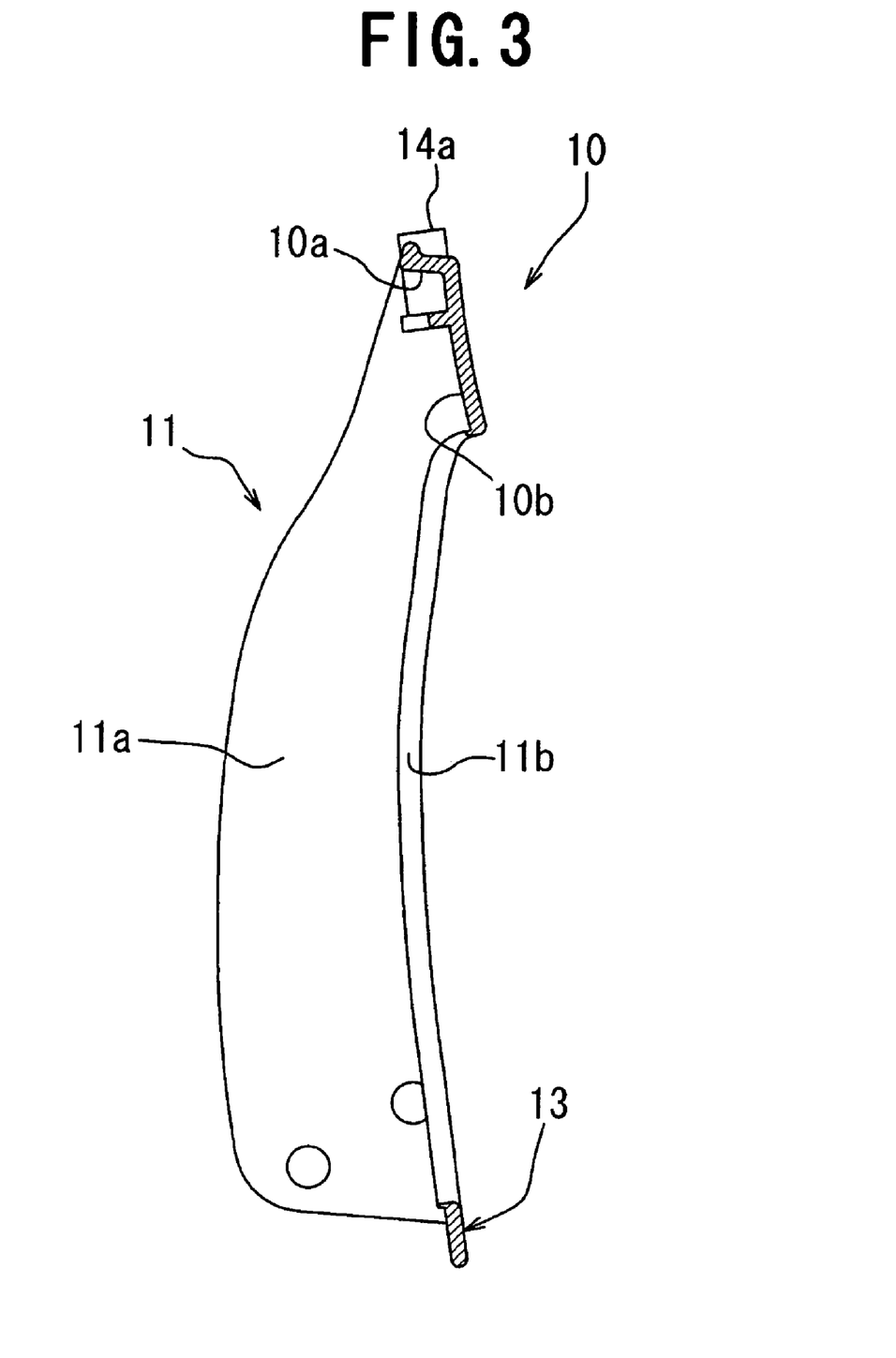
FIG. 3 is a schematic sectional view of the seat back frame of FIG. 2, taken on a plane indicated in FIG. 2 by a line 3-3.
Figure 4:
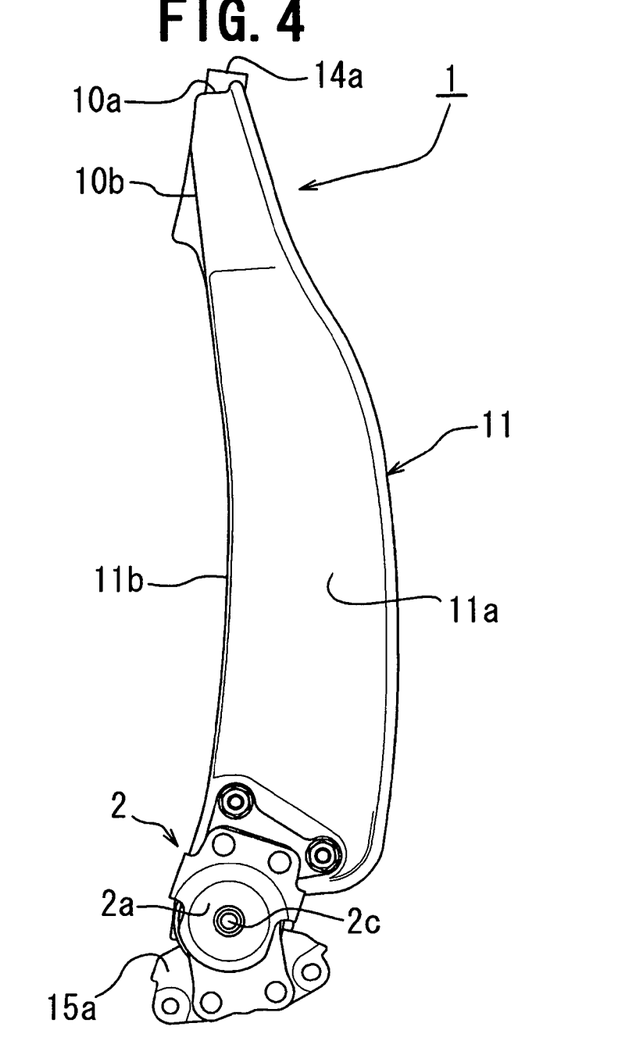
FIG. 4 is a schematic side view of the seat back frame shown in FIG. 1.

In order that a head rest (not shown) can be detachably mounted with respect to the seat back frame 1, the seat back frame 1 has a pair of spaced apart cylindrical holders 14a, 14b in which stays of the head rest are received and supported. The cylindrical holders 14a, 14b are mounted to the seat back frame 1 so as to extend downwardly from the top plate 10a along the back plate 10b. Furthermore, as shown in FIGS. 1 and 4, side brackets 15a, 15b are provided at the lower regions of the first and second side plates 11a, 12s, respectively. The side brackets 15a, 15b are adapted to be secured with respect to a seat cushion frame (not shown) by bolts.

The recliner means 2 comprises cam devices 2a, 2b that are mounted on lower regions of outer surfaces of the first and second side plates 11a, 12b, an actuating shaft 2c extending along the lower section 13 and interconnecting the cam devices 2a, 2b, and an operating lever (not shown) mounted on one end of the actuating shaft 2c that penetrates one of the cam devices 2a, 2b. A tilt angle of the seat back relative to a seat cushion of the vehicle seat is adapted to be adjusted by operating the operating shaft and causing the seat back to be pivoted relative to the seat cushion.

In addition to the respective components of the seat back frame that are discussed above, a pipe member 3 that is made of light metal such as aluminum or the like is mounted around an axial portion of the actuating shaft 2c. The pipe member 3 serves as means to reinforce a lower part of the seat back frame 1 that includes the plate-shaped lower section 13 having a width. Additionally, when any external force is applied to the seat back frame by, for example, crashing, the pipe member 3 can share the external force in cooperation with the plate-shaped lower section 13. Therefore, stiffness or resistance to any external force can be provided to the lower part of the seat back frame.

In the illustrated example, as an example of the pipe member 3, there is employed a pipe member having a length Y relatively shorter than that X of the actuating shaft 2c (X>Y, see FIG. 1). Thus, even if the pipe member 3 including the actuating shaft 2c is bent by the external force applied to the seat back frame, the pipe member 3 having a length relatively shorter than that of the actuating shaft 2c is not thrust. Therefore, impact energy that is produced by the external force will be effectively absorbed by the bending of the pipe member 3 including the actuating shaft 2c.

Figure 5:
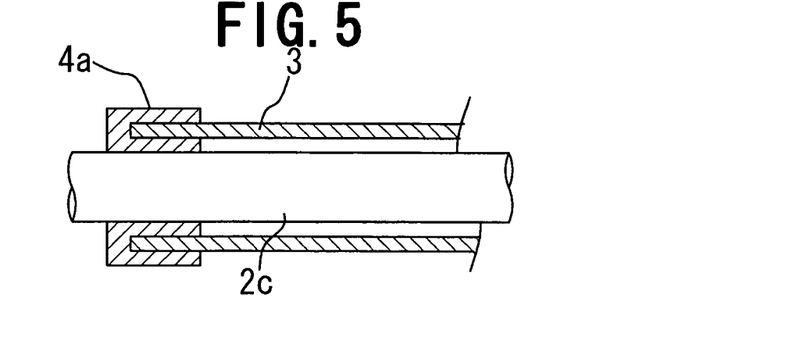
FIG. 5 is a schematic fragmentary sectional view of a pipe member mounted to the seat back frame of FIG. 1.

Again referring to FIG. 1 and referring to FIG. 5, the pipe member 3 may be provided with collars 4a, 4b that are mounted on both end portions of the pipe member 3. In this case, the pipe member 3 is idlingly mounted around the actuating shaft 2c. The collars 4a, 4b are made of lubricous resin material such as silicone or the like. Thus, when the recliner means is actuated by the operating shaft to thereby rotate the actuating shaft 2c, the rotation of the actuating shaft 2c is not interfered with and noise can be prevented from being generated due to friction that is produced between the actuating shaft and the pipe member.

In the reclining vehicle-seat that is provided with the light alloy seat back frame constructed as described above, the pipe member 3 is merely mounted around the axial portion of the actuating shaft 2c. Therefore, mounting of the pipe member 3 can be easily performed without interfering with mounting of the recliner means 2 to the seat back frame.

Figure 6:
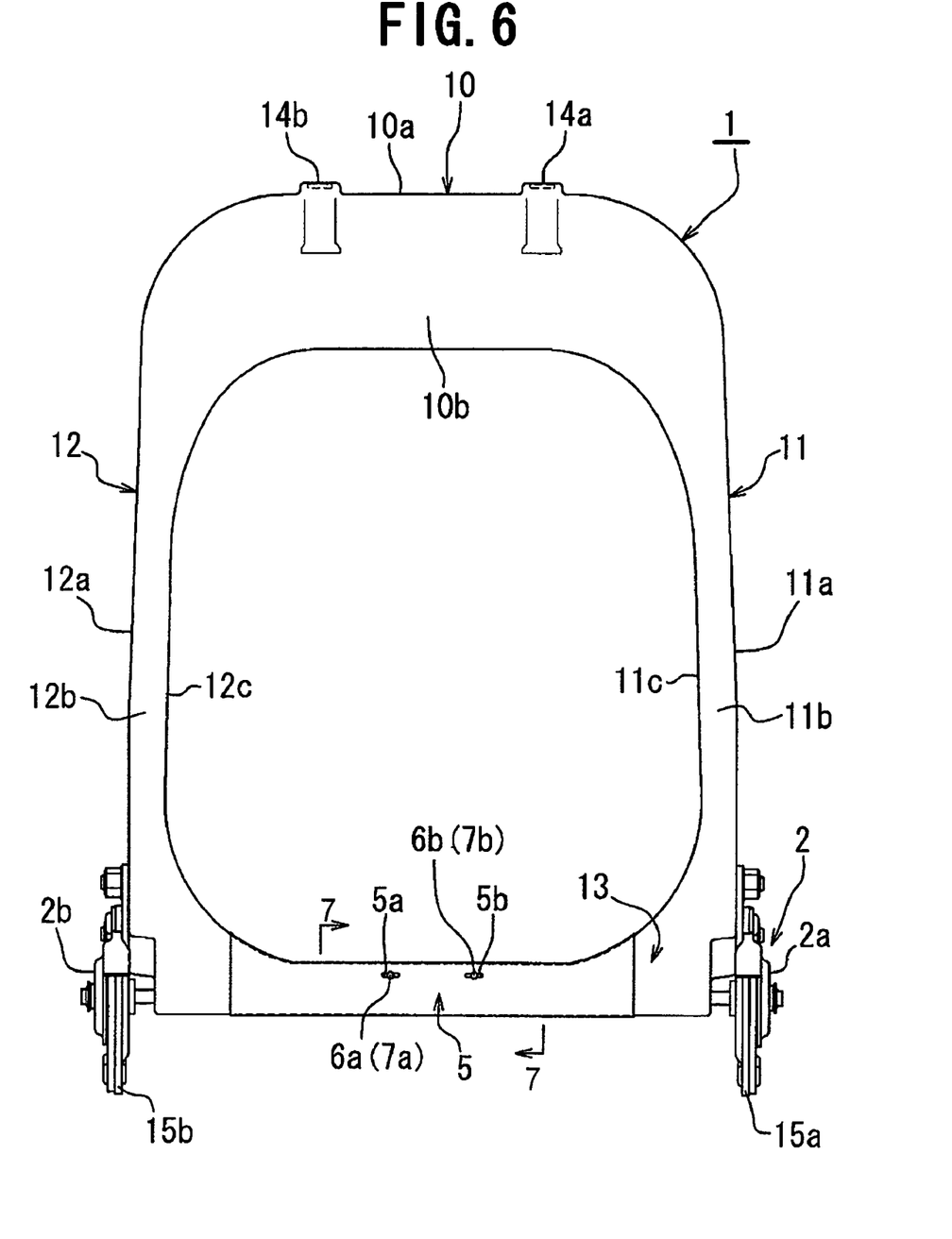
FIG. 6 is a schematic rear side view of the seat back frame of FIG. 1, in which a belt-shaped metal plate is applied and fixed onto a lower section of the seat back frame.

In addition to the pipe member 3, a belt-shaped flexible metal plate 5 such as a steel plate or the like is applied along a longitudinal direction of a rear surface of the lower section 13 of the seat back frame and fixed to the lower section 13 as shown in FIG. 6. Thus, the lower part of the seat back frame is further reinforced by the metal plate 5. In addition, when any external force is applied to the seat back frame by, for example, crashing, even if the lower section 13 is forced to be excessively bent, such excessively bending of the lower section 13 can be effectively prevented by the flexible metal plate 5.

Figure 7:
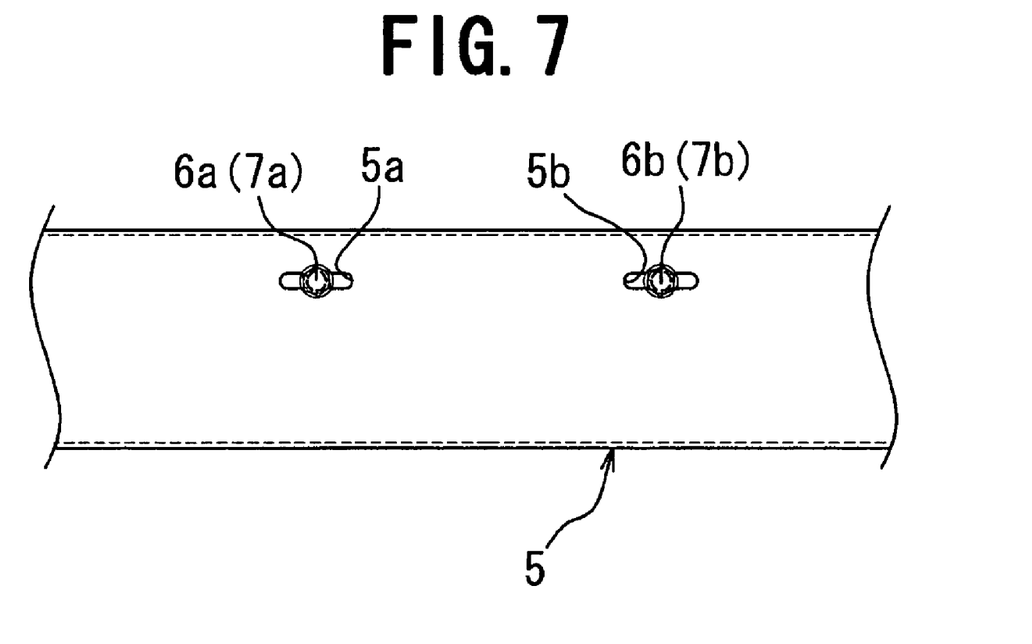
FIG. 7 is a schematic fragmentary rear side view of the belt-shaped metal plate that is indicated in FIG. 6 by arrows 7-7.

Referring now to FIG. 7, the flexible metal plate 5 may be formed with at least two horizontally extending holes 5a, 5b that are spaced apart from each other. Fixing of the flexible plate 5 to the lower section 13 is carried out by fastening the flexible plate 5 to the lower section 13 by means of bolts 6a, 7a that are penetrated through the lower section 13 from substantially central portions of the horizontally extending holes 5a, 5b, and nuts 6b, 7b.

Figure 8:
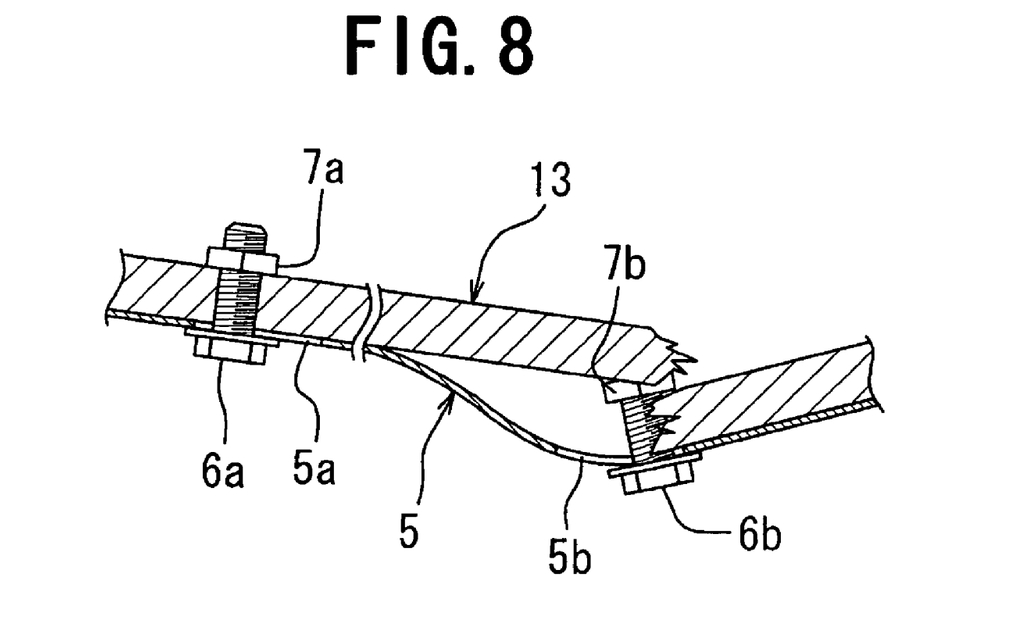
FIG. 8 is a schematic sectional view that is of assistance in explaining the function of the belt-shaped metal plate.

In the case where the belt-shaped metal plate 5 is applied onto the lower section 13 and fixed onto the lower section 13 by the bolts and the nuts, even if the lower section 13 is cracked by, for example, crashing, the fastening means including the bolts 6a, 7a and the nuts 6b, 7b are shifted along the horizontally extending holes 5a, 5b and the belt-shaped metal plate 5 is simultaneously flexed, receives and holds a cracked portion of the lower section 13 as shown in FIG. 8. Therefore, excessively projecting of the cracked portion of the lower section 13 can be effectively prevented by the belt-shaped plate 5.

While the belt-shaped plate 5 is applied and fixed onto the rear surface of the lower section 13 in the illustrated example, it may be applied and fixed onto a front surface of the lower section 13.

It will be recognized by those skilled in the art that changes or modifications may be made to the above-identified embodiment without departing from the broad inventive concepts of the invention. It is understood, therefore, that the invention is not limited to the particular embodiment which is described, but is intended to cover all modifications and changes within the scope and spirit of the invention as described above and set forth in the appended claims.

What is claimed is:

1. A light alloy seat back frame for a vehicle seat, comprising:
    a pair of spaced apart side sections;
    an upper section interconnecting said spaced apart side sections;
    a lower section formed into a substantially plate-shape having a width;
    said lower section extending between lower regions of rear sides of said spaced apart side sections and interconnecting said spaced apart side sections;
    said upper, side and lower sections being integrally made of light alloy; and
    a belt-shaped metal plate applied along a longitudinal direction of said lower section and fixed onto a surface of said lower section;
    said belt-shaped metal plate being formed with at least two horizontally extending holes and fixed onto said surface of said lower section by fastening said belt-shaped metal elate onto said surface of said lower section by means of bolts that are penetrated through said lower section from substantially central portions of said at least two horizontally extending holes, and nuts.

2. A light alloy seat back frame according to claim 1, wherein said seat back frame further includes:
    a recliner means for allowing a seat back of a vehicle seat to be pivoted with respect to a seat cushion of said vehicle seat;
    said recliner means comprising cam devices mounted onto lower regions of outer surfaces of said spaced apart side sections, and an actuating shaft extending along said lower section and interconnecting said cam devices; and
    a metal pipe member for reinforcing a lower part of said seat back frame;
    said pipe member being mounted around an axial portion of said actuating shaft.

3. A light alloy seat back frame according to claim 2, wherein said metal pipe member has a length relatively shorter than that of said actuating shaft.

4. A light alloy seat back frame according to claim 3, wherein said pipe member is provided with collars that are attached to both end portions of said pipe member, said collars being made of resinous material, and wherein said pipe member is idlingly mounted around said axial portion of said actuating shaft.

5. A reclining vehicle-seat comprising said light alloy seat back frame as set forth in claim 4.

6. A reclining vehicle-seat comprising said light alloy seat back frame as set forth in claim 3.

7. A reclining vehicle-seat comprising said light alloy seat back frame as set forth in claim 2.

8. A light alloy seat back frame according to claim 2, wherein said pipe member is provided with collars that are attached to both end portions of said pipe member, said collars being made of resinous material, and wherein said pipe member is idlingly mounted around said axial portion of said actuating shaft.

9. A reclining vehicle-seat comprising said light alloy seat back frame as set forth in claim 8.

10. A reclining vehicle-seat comprising said light alloy seat back frame as set forth in claim 1.

11. A seat back frame for a vehicle seat, comprising:
    a pair of spaced apart side sections;
    an upper section interconnecting said spaced apart side sections;
    a lower section formed into a substantially plate-shape having a width;
    said lower section extending between lower regions of rear sides of said spaced apart side sections and interconnecting said lower regions of said rear sides of said spaced apart side sections;
    said upper, side and lower sections being integrally made of light alloy;

a recliner means for allowing a seat back of a vehicle seat to be pivoted with respect to a seat cushion of said vehicle seat;

said recliner means comprising cam devices mounted onto lower regions of outer surfaces of said spaced apart side sections, and an actuating shaft extending along said lower section and interconnecting said cam devices; and a metal pipe member for reinforcing a lower part of said seat back frame;

said pipe member being mounted around an axial portion of said actuating shaft.

12. A seat back frame according to claim 11, wherein said metal pipe member has a length relatively shorter than that of said actuating shaft.

13. A seat back frame according to claim 12, wherein said pipe member is provided with collars that are attached to both end portions of said pipe member, said collars being made of resinous material, and wherein said pipe member is idlingly mounted around said actuating shaft.

14. A seat back frame according to claim 13, further including a belt-shaped metal plate applied along a longitudinal direction of said lower section and fixed onto a surface of said lower section.

15. A reclining vehicle-seat comprising said seat back frame as set forth in claim 14.

16. A reclining vehicle-seat comprising said seat back frame as set forth in claim 13.

17. A seat back frame according to claim 12, further including a belt-shaped metal plate applied along a longitudinal direction of said lower section and fixed onto a surface of said lower section.

18. A reclining vehicle-seat comprising said seat back frame as set forth in claim 17.

19. A reclining vehicle-seat comprising said seat back frame as set forth in claim 12.

20. A seat back frame according to claim 11, wherein said pipe member is provided with collars that are attached to both end portions of said pipe member, said collars being made of resinous material, and wherein said pipe member is idlingly mounted around said actuating shaft.

21. A seat back frame according to claim 20, further including a belt-shaped metal plate applied along a longitudinal direction of said lower section and fixed onto a surface of said lower section.

22. A reclining vehicle-seat comprising said seat back frame as set forth in claim 21.

23. A reclining vehicle-seat comprising said seat back frame as set forth in claim 20.

24. A seat back frame according to claim 11, further including a belt-shaped metal plate applied along a longitudinal direction of said lower section and fixed onto a surface of said lower section.

25. A reclining vehicle-seat comprising said seat back frame as set forth in claim 24.

26. A reclining vehicle-seat comprising said seat back frame as set forth in claim 11.

27. A reclining vehicle-seat comprising:
a seat back frame;
a pair of spaced apart side sections;
an upper section interconnecting said spaced apart side sections;
a lower section formed into a substantially plate-shape having a width;
said lower section extending between lower regions of rear sides of said spaced apart side sections and interconnecting said lower regions of said rear sides of said spaced apart side sections;

said upper, side and lower sections being integrally made of light alloy;

a recliner means for allowing a seat back of said reclining vehicle-seat to be pivoted with respect to a seat cushion of said reclining vehicle-seat;

said recliner means comprising cam devices mounted onto lower regions of outer surfaces of said spaced apart side sections, and an actuating shaft extending along said lower section and interconnecting said cam devices; and a metal pipe member for reinforcing a lower part of said seat back frame;

said pipe member being mounted around an axial portion of said actuating shaft.

28. A reclining vehicle-seat according to claim 27, wherein said metal pipe member has a length relatively shorter than that of said actuating shaft.

29. A reclining vehicle-seat according to claim 28, wherein said pipe member is provided with collars that are attached to both end portions of said pipe members, said collars being made of resinous material, and wherein said pipe member is idlingly mounted around said actuating shaft.

30. A reclining vehicle-seat according to claim 29, further including a belt-shaped metal plate applied along a longitudinal direction of said lower section and fixed onto a surface of said lower section.

31. A reclining vehicle-seat according to claim 30, wherein said belt-shaped metal plate is formed with at least two horizontally extending holes and is fixed onto said surface of said lower section by fastening said belt-shaped metal plate onto said surface of said lower section by means of bolts that are penetrated through said lower section from substantially central portions of said at least two horizontally extending holes, and nuts.

32. A reclining vehicle-seat according to claim 28, further including a belt-shaped metal plate applied along a longitudinal direction of said lower section and fixed onto a surface of said lower section.

33. A reclining vehicle-seat according to claim 32, wherein said belt-shaped metal plate is formed with at least two horizontally extending holes and is fixed onto said surface of said lower section by fastening said belt-shaped metal plate onto said surface of said lower section by means of bolts that are penetrated through said lower section from substantially central portions of said at least two horizontally extending holes, and nuts.

34. A reclining vehicle-seat according to claim 27, wherein said pipe member is provided with collars that are attached to both end portions of said pipe members, said collars being made of resinous material, and wherein said pipe member is idlingly mounted around said actuating shaft.

35. A reclining vehicle-seat according to claim 34, further including a belt-shaped metal plate applied along a longitudinal direction of said lower section and fixed onto a surface of said lower section.

36. A reclining vehicle-seat according to claim 35, wherein said belt-shaped metal plate is formed with at least two horizontally extending holes and is fixed onto said surface of said lower section by fastening said belt-shaped metal plate onto said surface of said lower section by means of bolts that are penetrated through said lower section from substantially central portions of said at least two horizontally extending holes, and nuts.

37. A reclining vehicle-seat according to claim 27, further including a belt-shaped metal plate applied along a longitudinal direction of said lower section and fixed onto a surface of said lower section.

38. A reclining vehicle-seat according to claim 37, wherein said belt-shaped metal plate is formed with at least two horizontally extending holes and is fixed onto said surface of said lower section by fastening said belt-shaped metal plate onto said surface of said lower section by means of bolts that are penetrated through said lower section from substantially central portions of said at least two horizontally extending holes, and nuts.

* * * * *

UNITED STATES PATENT AND TRADEMARK OFFICE
CERTIFICATE OF CORRECTION

| | |
|---|---|
| PATENT NO. | : 7,513,574 B2 |
| APPLICATION NO. | : 11/185354 |
| DATED | : April 7, 2009 |
| INVENTOR(S) | : Nagayama et al. |

It is certified that error appears in the above-identified patent and that said Letters Patent is hereby corrected as shown below:

Col. 7, Line 59,

Claim 27, after line 2, insert the following line at line 3:

-- said seat back frame comprising; --

Signed and Sealed this

Eighteenth Day of May, 2010

David J. Kappos
*Director of the United States Patent and Trademark Office*